UNITED STATES PATENT OFFICE.

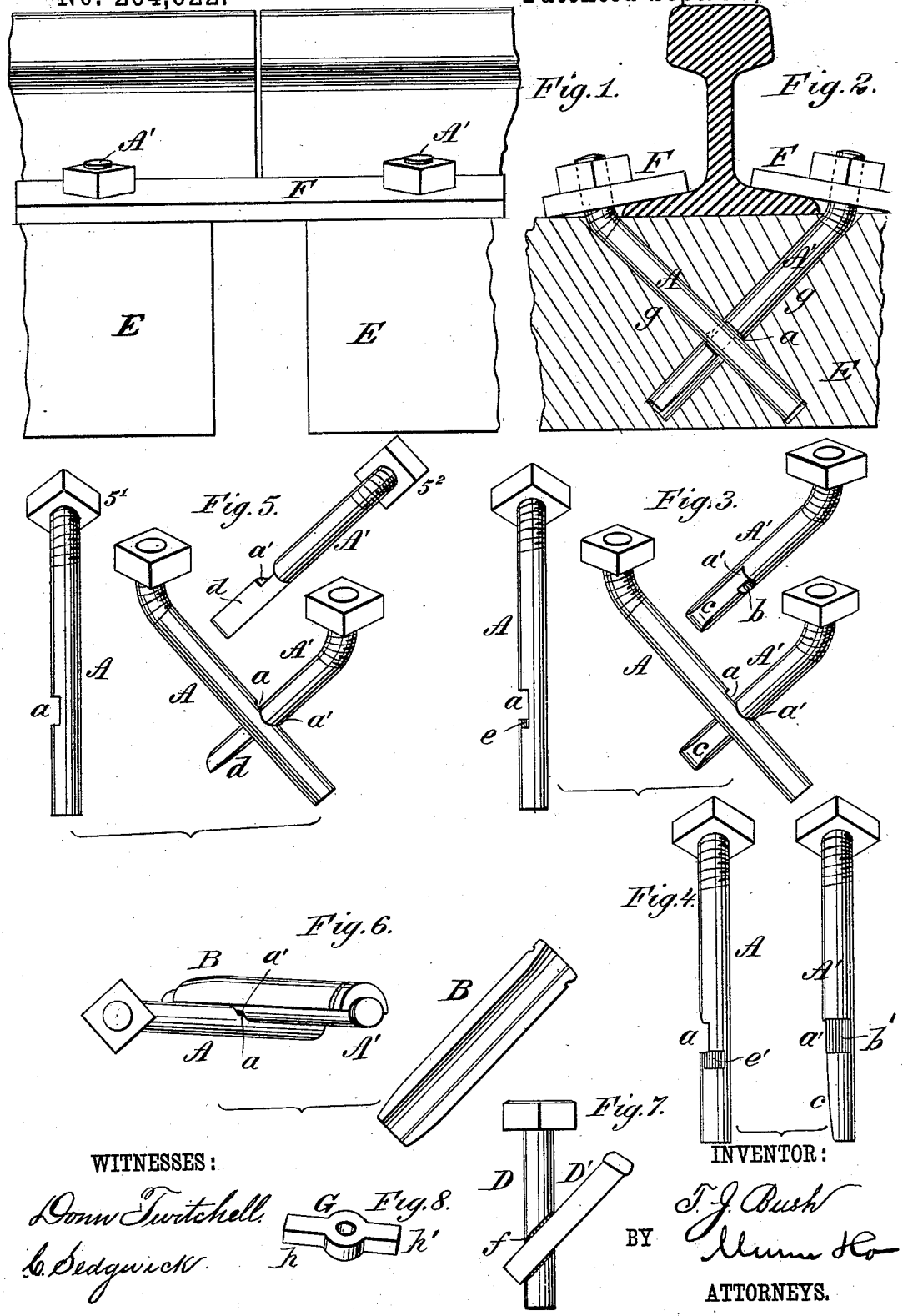

THOMAS J. BUSH, OF LEXINGTON, KENTUCKY.

INTERLOCKING BOLT.

SPECIFICATION forming part of Letters Patent No. 264,622, dated September 19, 1882.

Application filed January 16, 1882. (No model.)

*To all whom it may concern:*

Be it known that I, THOMAS J. BUSH, of Lexington, in the county of Fayette and State of Kentucky, have invented certain new and useful Improvements in Interlocking Bolts, of which the following is a full, clear, and exact description.

This invention relates to certain improvements in my new and improved interlocking bolts shown and described in my application for Letters Patent therefor which was allowed November 2, 1881.

It will be understood from my said application, and from the following description, that my new interlocking bolts are adapted to bolt two or more blocks, planks, or pieces of wood, stone, or metal together, or to secure any object to or upon another, without the holes in which the bolts are placed being made entirely through to the surface opposite to that against which the nuts or bars are screwed upon the bolts, the bolts being formed without heads, and used with only one bar or nut. Where only a single bolt is needed, the bolt will not be bent, as where two bolts are used, but will be made straight and formed with a notch or passage in or through the bolt at a suitable distance from its lower end, and used in connection with a diagonally-placed spike, bolt, or plate which passes through the passage or rests in the notch in the bolt.

Reference is to be had to the accompanying drawings, forming part of this specification, in which similar letters of reference indicate corresponding parts in all the figures.

Figure 1 is a side elevation of a railroad-joint formed with my improved bolts and plates. Fig. 2 is a sectional elevation of the same. Fig. 3 represents in perspective and in different positions the round interlocking bolts formed with the main locking-notches, and formed upon the back with recesses for the main locking-notches to rest in, and one of them formed with a stop on one side to indicate the proper depth of its insertion. Fig. 4 represents in perspective the bolts faced off at the back, one being formed with a stop. Fig. 5 represents in perspective, and in different positions, the bolts formed in such manner that one of them is adapted to be given a quarter-turn, after its insertion in the hole, to form the lock. Fig. 6 represents in perspective the bolts formed in such manner that they are adapted to be brought into locked position in the holes by means of a wedge. Fig. 7 is a front elevation of the straight bolt and its locking spike or plate, and Fig. 8 is a perspective view of a plate used in connection with my improved bolts for holding railroad-rails.

A A' represent the bolts, which are bent, as shown in the drawings, and are preferably round in cross-section. These bolts are formed with the notches $a$ $a'$, which may be plain notches, for forming the lock, as shown in Fig. 6, and at $a\,5'$, Fig. 5, formed by cutting away a narrow portion of the metal of the bolts. By preference these notches $a$ $a'$ are, however, formed as shown in Figs. 3 and 4, the notch $a$ being essentially a plain notch formed by cutting away a narrow portion of the bolt, as in Figs. 5 and 6 just mentioned, while the notch $a'$ is formed by cutting away a portion of the bolt from the notch or stop proper to the end of the bolt, this portion being removed in such manner as to make the side of the bolt below the notch slightly curved, as shown at $c$.

In Fig. 6 the bolts are not faced off at the back, nor is the bolt shown at $5'$, Fig. 5. Although a good and practical lock is made by this plain form of bolt and notch, in order that the lock may be still firmer and the bolts less apt to turn, so as to become wholly or partially unlocked, I prefer to form a square or flat surface for the locking-notch $a$ of the bolt A to come against when locked with the bolt A', by forming a semi-cylindrical recess in the back of the bolt A', as shown at $b$, Fig. 3, for the notch of the bolt A to rest in, or to face the bolt off entirely across its back, as shown at $b'$ in Fig. 4. By thus facing off or recessing the bolt A' the bolts are not so apt to turn so as to become wholly or partially unlocked; but the lock is in this manner made firm and reliable.

In order to still further insure the proper and secure locking of the bolts, the bolt A may be formed with the notch $e$ upon the back of the bolt below the notch $a$, as shown in Fig. 3; or it may be faced off, as shown at $e'$ in Fig. 4, below the notch $a$.

In the form of bolts shown in Fig. 5 the notch $a$ in the bolt A is, as above mentioned, a plain notch, but is somewhat deeper than in the forms shown in Figs. 3 and 4, and a considerable portion of the bolt A' is cut away at the back, as shown at $d$, and the notch $a'$ is formed of such a depth that the thickness of metal of the bolt at that point will not interfere with the bolt A' being turned in the hole to form the lock. With this construction of the bolts the bolt A' is to be turned to the position shown at $5^2$, and while in that position inserted in the hole, so that the face $d$ will pass through the notch $a$ of the bolt A until the notches $a$ and $a'$ coincide; then the bolt A' is to be given a one-quarter turn upwardly to form the lock.

In the form of bolts shown in Fig. 6 the bolts A and A' are identical in construction, and the notches therein are plain notches, and are of greater depth than in any of the other forms, and they are intended to be used with the semi-cylindrical wedge B, which is to be driven into the hole by the side of one of the bolts to force it over to form the lock and retain the bolts in locked position, one of the holes for the bolts being made sufficiently large to receive the wedge. For unlocking the bolts the wedge B will be removed from the hole and, if necessary, driven upon the other side of the bolt, which will force the bolts apart and permit them to be withdrawn.

In Fig. 7 the bolt D is a straight bolt formed with the notch $f$, and is to be used in connection with the spike or plate D', which is to be passed into a hole made diagonal to the hole in which the bolt D is to be placed, in such manner that the plate D' may be passed into and through the notch $f$. In this manner, the spike or plate D' being in place, the burr or nut of the bolt may be turned up in the same manner and for like purposes as with the bolts A A'.

In using my improved bolts for any purpose—say for securing the ends of railroad-rails to the ties to form the joint—the tie E is first to be bored with the diagonal holes $g$ $g$ upon the opposite sides of the rail, as clearly shown in Fig. 2, the holes being made so as to properly intersect each other at the angle at which the bolts are made to lock. The fish-plates F F are then placed upon the flanges of the rails across the joint and the bolts inserted through the holes in the plates and into the holes in the tie, the bolt A being inserted first and drawn up first. If the form of bolt shown in Figs. 3 and 4 be used, the lock will in this manner be automatically formed. If the form of bolts shown in Fig. 5 be used, the lock will be formed by turning the bolt A' after its insertion. If the form shown in Fig. 6 be used, the lock will be formed by the insertion of the wedge, as already described. If the form of bolt shown in Fig. 7 be used, the holes in which the bolts are placed will be, by preference, made vertical, while the hole in which the spike or plate is inserted will be diagonal thereto and intersecting the straight hole.

It will be noticed that in the forms of bolts shown in Figs. 3, 4, and 5, the distance of insertion of the bolt A' will be indicated by the notch $a'$, which forms a shoulder or stop, as clearly indicated in the drawings, which comes against the bolt A when the proper distance of insertion has been reached to form the lock.

In securing railroad-rails between their ends the plate G will be used, which is formed, as clearly shown in Fig. 8, with the extensions $h$ $h'$, which rest respectively upon the flange of the rail and the tie, the extension $h'$ serving to cover the holes in the tie to prevent the entrance of water.

The fish-plates F F are of such width as to cover the holes in which the bolts are placed and protect them from water, as clearly shown in Fig. 2. In case these or similar plates are not used, the holes may be filled with coal-tar or other similar substance to preserve the tie and prevent the entrance of water.

It will be understood that I do not confine myself to any particular use of my improved interlocking bolts, as they can be advantageously used in bridge-building, ship-building, and applied to many other places. When used for making the joints of railroad-rails it will be seen that the rails can be easily leveled up at the time the joint is made, and at any subsequent time, when necessity requires, by simply applying a wrench to the nuts of the bolts and turning them up until the ends of the rails come in line.

It will also be understood, when it is desired to have the bolts lock with each other at an angle other than a right angle, that the notches, instead of being made straight across the bolts, as shown in the drawings, will be made diagonally across the bolts to conform to such angle.

The right is reserved to make a separate application for a patent on the cross-bolts made with the respective recesses $b$ $e$, also on the facing of the bolt A' off at the back, so as to form a flat face, and the cutting of it away at $d$.

Having thus fully described my invention, I claim as new and desire to secure by Letters Patent—

1. The combination of bent bolts A and A', formed with the locking-notches $a'$ and $a'$ a suitable distance from their lower ends, the bolts being polygonal or round in cross-section, substantially as described.

2. The combination, with a railroad-tie provided with crossing holes and apertured fish-plates F, of the cross-locked bolts A A', bent, threaded, and nutted on their ends, whereby the rail-flanges are rigidly secured to the ties, as described.

3. The bent bolt A, formed with the notch $a$, and faced off at the back, as shown at $e'$, in combination with the bolt A', faced off at the back, as shown at $b'$, and formed with the notch $a'$ and the curved face $c$, substantially as described.

4. The combination, with the notched and bent bolts A A', of the wedge B, substantially as described.

5. The combination, with the bent and notched bolts A A', of the plates F F, substantially as shown and described.

6. The combination, with the bent and notched bolts A A', of the plates G, formed with the extensions $h\ h'$, as and for the purposes set forth.

THOMAS J. BUSH.

Witnesses:
H. A. WEST,
C. SEDGWICK.